United States Patent [19]

Tanaka et al.

[11] Patent Number: 5,739,967
[45] Date of Patent: Apr. 14, 1998

[54] LENS BARREL HAVING A REDUCED DIAMETER

[75] Inventors: Masatsune Tanaka, Kuroiso; Junichi Kurita, Ohtawara, both of Japan

[73] Assignee: Nikon Corporation, Tokyo, Japan

[21] Appl. No.: 701,792

[22] Filed: Aug. 26, 1996

[30] Foreign Application Priority Data

Aug. 31, 1995 [JP] Japan .................... 7-223150

[51] Int. Cl.⁶ ............................ G02B 7/02; G02B 15/14
[52] U.S. Cl. ........................ 359/826; 359/700; 359/701
[58] Field of Search ........................... 359/826, 699, 359/700, 701

[56] References Cited

U.S. PATENT DOCUMENTS

| | | | |
|---|---|---|---|
| 4,089,590 | 5/1978 | Sakata | 359/706 |
| 4,154,510 | 5/1979 | Katagiri | 359/826 |
| 4,993,815 | 2/1991 | Yamazaki et al. | 359/699 |
| 5,218,479 | 6/1993 | Chiou et al. | 359/700 |
| 5,285,322 | 2/1994 | Horning et al. | 359/826 |
| 5,376,983 | 12/1994 | Yamazaki et al. | 354/195.12 |
| 5,446,593 | 8/1995 | Hamasaki et al. | 359/704 |

*Primary Examiner*—David C. Nelms
*Assistant Examiner*—Ricky Mack

[57] ABSTRACT

A lens barrel comprises a lens unit movable in an optical-axis direction of the lens barrel, and a lens holding drum, having a sliding portion protruded in the optical-axis direction at its end portion, for holding the lens unit. The lens barrel also comprises a fixed drum having the same diameter as that of the lens holding drum and provided with a guiding portion at its end portion, for accommodating the sliding portion and rectilinearly guiding the sliding portion in the optical-axis direction, and a driving mechanism for driving the lens unit with action upon the lens holding drum.

5 Claims, 3 Drawing Sheets

LENS BARREL HAVING A REDUCED DIAMETER

BACKGROUND OF THE INVENTION

1. Field of the Invention

The present invention relates generally to a lens barrel and more particularly to a lens barrel improved for reducing a diameter of the lens barrel.

2. Related Background Art

FIG. 1 is a view of assistance in explaining a structure of a conventional lens barrel 1. The conventional lens barrel 1 will hereinafter be briefly described with reference to FIG. 1.

A zoom ring 2 is an annular member for adjusting a position of a focus adjusting lens unit L1 in an optical-axis direction A by an external operation. The zoom ring 2 is so provided on an outer periphery of a rear portion of the lens barrel 1 as to be rotatable about the optical axis A.

A cam ring 3 is a cylindrical member formed with a cam groove 3a for defining a position of the lens unit L1 in the optical-axis direction A. The cam ring 3 is so provided on an outer periphery of a fixed drum 4 as to be rotatable about the optical axis A. A pin 5 is provided on the outer periphery of a rear end portion of the cam ring 3. Herein, a head of the pin 5 is fitted to an inner periphery of the zoom ring 2, and hence the zoom ring 2 and the cam ring 3 rotate integrally about the optical axis A.

A lens holding drum 6 holds the lens unit L1 at its front end portion and is movably fitted to an inner peripheral surface of the fixed drum 4. Further, the lens holding drum 6 is provided with a pin 7 on its outer periphery of the rear end portion thereof. The pin 7 penetrates a rectilinear groove 4a formed in the fixed drum 4, and a head of the pin 7 is inserted in the cam groove 3a of the cam ring 3. Accordingly, when the cam ring 3 makes a rotational motion, the pin 7 moves back and forth in the optical-axis direction in accordance with a shape of the cam groove 3a. As a result, the lens holding drum 6 is also moved in the optical-axis direction, thus adjusting a focus of the optical system.

In the above-described conventional lens barrel, however, the lens holding drum 6 is constructed so that the same drum 6 is disposed on the inner peripheral side of the fixed drum 4. In other words, the conventional lens barrel includes the lens holding drum 6 on the outer periphery of the lens unit and also the fixed drum 4 on the outer peripheral side thereof. The lens barrel therefore inevitably becomes large in its outside diameter, resulting in such a drawback that downsizing of the lens barrel is hard to attain.

SUMMARY OF THE INVENTION

To obviate the problem given above, a lens barrel in an embodiment of the present invention comprises a lens unit L1 movable in an optical-axis direction, and a lens holding drum 11, having a sliding portion 11a protruded in the optical-axis direction at its end portion, for holding the lens unit L1. The lens barrel also comprises a fixed drum 12 having the same diameter as that of the lens holding drum 11 and provided with a guiding portion 12a at its end portion, for accommodating the sliding portion 11a and rectilinearly guiding the sliding portion 11a in the optical-axis direction, and a driving mechanism 2, 5, 3, 3a, 13 for driving the lens unit L1 with action upon the lens holding drum 11.

A lens barrel in another embodiment of the present invention comprises a lens unit L1 movable in an optical-axis direction, and a lens holding member 25, having two or more sliding portions 22 provided on an outer periphery of the lens unit L1 in a discrete manner in a circumferential direction. The lens barrel also comprises a fixed drum 21 having a guiding portion 21a for accommodating the sliding portion 22 and rectilinearly guiding the sliding portion 22 in the optical-axis direction, and a driving mechanism 2, 5, 3, 3a, 13 for driving the lens unit L1 with action upon the lens holding member 25.

BRIEF DESCRIPTION OF THE DRAWINGS

Other objects and advantages of the present invention will become apparent during the following discussion in conjunction with the accompanying drawings, in which.

DESCRIPTION OF THE PREFERRED EMBODIMENTS

Hereinafter, embodiments of the present invention will be discussed in detail with reference to the accompanying drawings.

(First Embodiment)

Figure 1:
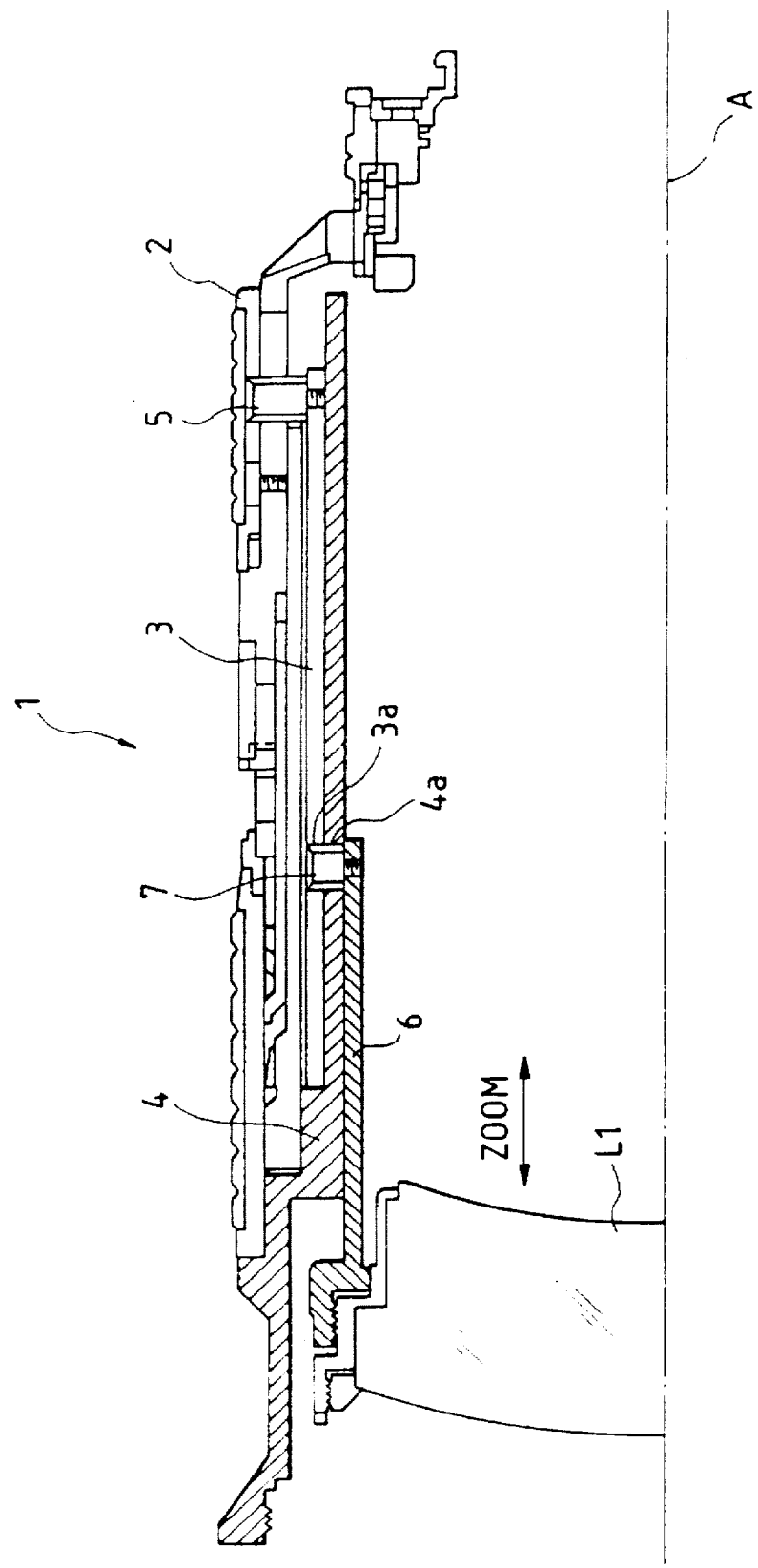
FIG. 1 is a view of assistance in explaining a structure of a conventional lens barrel.
Figure 2:
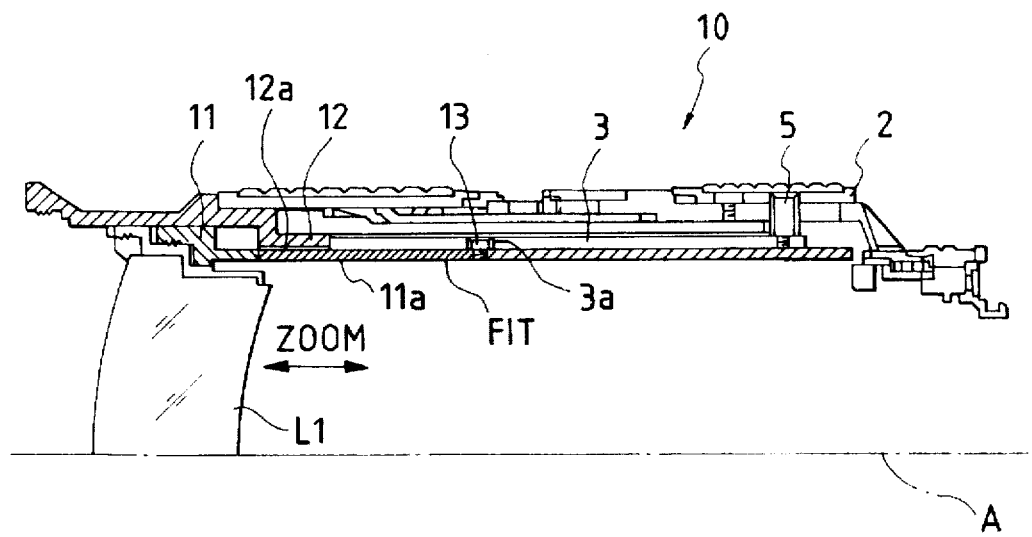
FIG. 2 is a sectional view showing a first embodiment of the present invention.
Figure 3:
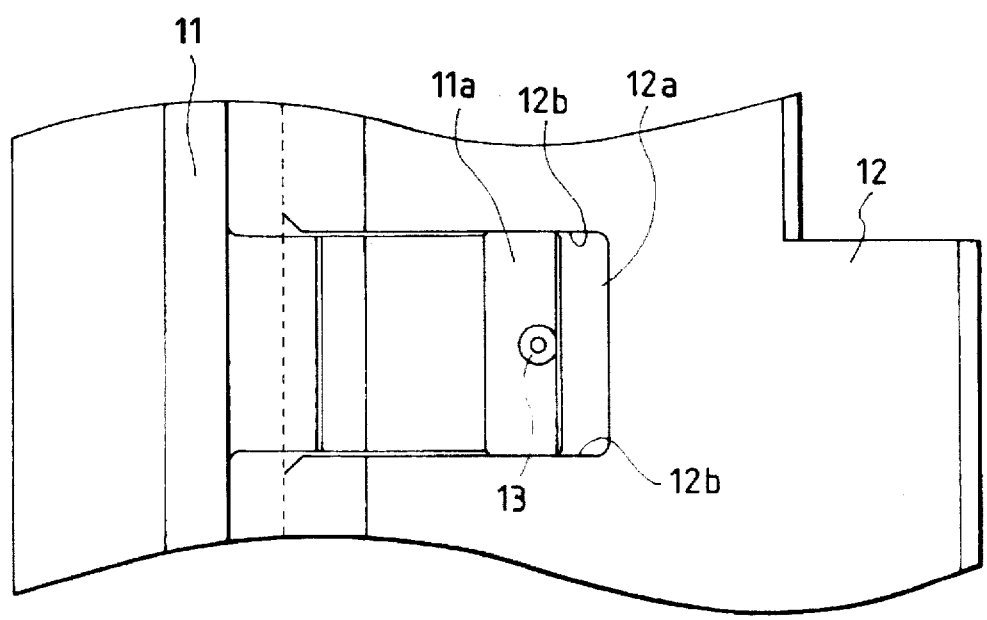
FIG. 3 is a partial development elevation of a lens holding drum and a fixed drum that are used in the first embodiment of the present invention.

FIG. 2 is a sectional view illustrating a first embodiment. FIG. 3 is a partial development elevation of a lens holding drum and a fixed drum. A construction of the first embodiment will hereinafter be explained referring to FIGS. 2 and 3. Note that the elements performing the same functions as those in the conventional lens barrel are marked with the like numerals, and repetitive explanations thereof are properly omitted.

In a lens barrel 10 in accordance with the first embodiment, a lens holding drum 11 for holding a lens unit L1 has substantially the same diameter as that of a fixed drum 12 and is disposed in front of the fixed drum 12. Further, the lens holding drum 11 includes three pieces of protrusions (hereinafter termed "sliding portions 11a") arranged at equal intervals in a circumferential direction on the rear end thereof. Further, the sliding portion 11a has a pin 13 formed on its outer periphery of a rear end portion thereof.

On the other hand, the fixed drum 12 is formed with three notches (hereinafter called "guiding portions 12a") in positions, corresponding to the sliding portions 11a, of front end portion thereof. The guiding portion 12a has substantially the same width in the circumferential direction as that of the sliding portion 11a, and two side surfaces 12b thereof are provided substantially in parallel to the optical axis A. Accordingly, as illustrated in FIG. 3, in a state where the guiding portion 12a accommodates the sliding portion 11a, the guiding portion 12a functions as a rectilinear guide groove for guiding the sliding portion 11a in the optical-axis direction A.

In accordance with the first embodiment, when rotationally operating the zoom ring 2 from outside, a rotational motion thereof is transferred via the pin 5 to the cam ring 3 as in the same way with the conventional art. Further, the rotational motion of the cam ring 3 is converted into a rectilinear motion by the cam groove 3a as well as by the pin 13 movable in only the optical-axis direction A because of being provided on the sliding portion 11a. The lens holding drum 11 and the lens unit L1 are thereby moved in the optical-axis direction A, and the lens barrel 10 in the first embodiment changes a focal length of the optical system thereof.

As discussed above, unlike the conventional construction that the pin 7 for converting the rotational motion of the cam ring 3 into the rectilinear motion is rectilinearly guided by the rectilinear groove 4a formed in the fixed drum 4, the first embodiment adopts such a construction that the pin 13 is provided on the sliding portion 11a, and a kinetic direction of the sliding portion 11a is restricted by use of the guiding portion 12a, thus rectilinearly guiding the pin 13 through the sliding portion 11a. Therefore, the lens holding drum 11 is not required to be disposed on the inner peripheral side of the fixed drum 12 and is, in accordance with the first embodiment, disposed in a position adjacent to the optical-axis direction of the fixed drum 12. As a result, in the first embodiment, the lens holding drum and the fixed drum 12 seemingly form one cylindrical member, and it is possible to provide the lens barrel 10 with its downsizing to such an extent that the outside diameter thereof is smaller by a thickness of the lens holding drum 11 than the fixed drum in the conventional art.

(Second Embodiment)

Figure 4:
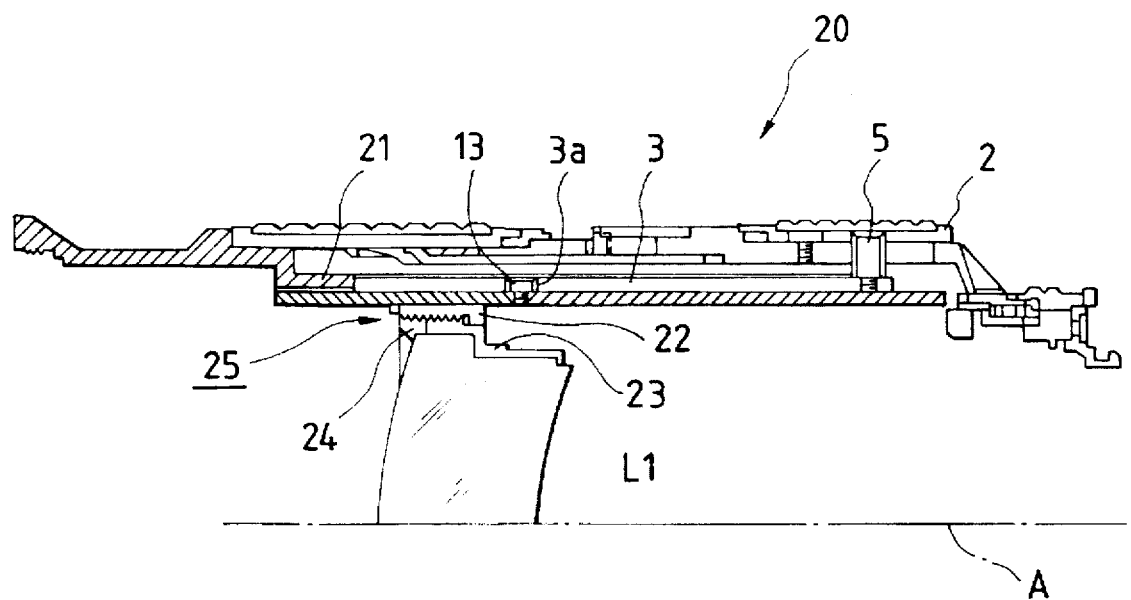
FIG. 4 is a sectional view showing a second embodiment of the present invention.
Figure 5:
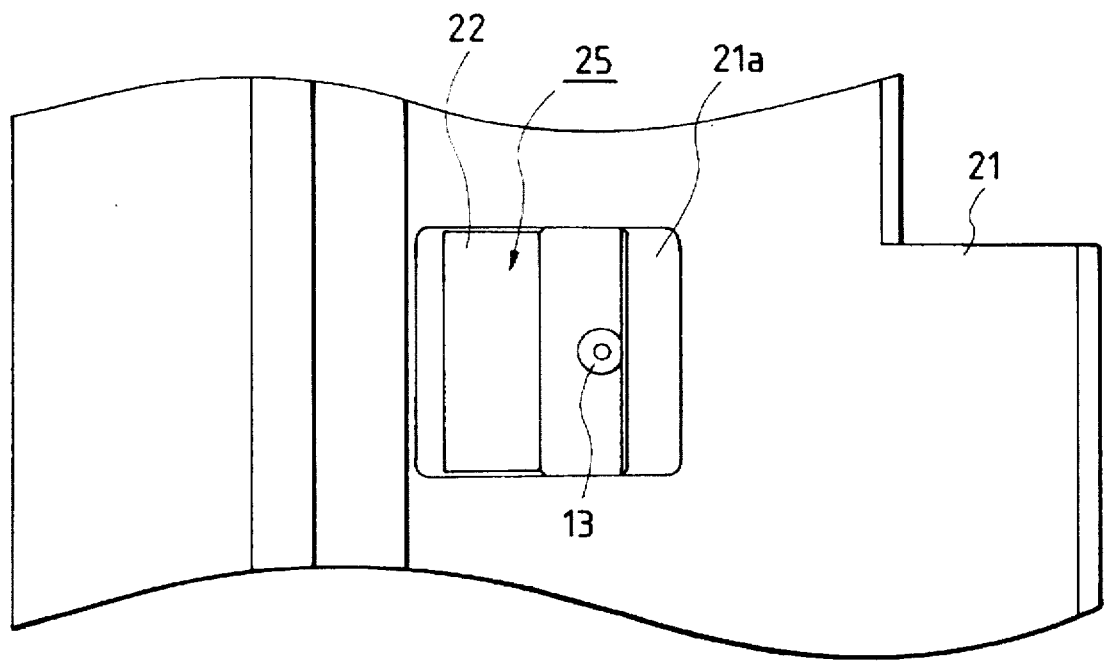
FIG. 5 is a partial development elevation of the lens holding member and the fixed drum that are used in the second embodiment of the present invention.

FIG. 4 is a sectional view illustrating a second embodiment of the present invention. FIG. 5 is a partial development elevation of the lens holding member and the fixed drum.

A lens barrel 20 in the second embodiment has three pieces of guiding portions 21a corresponding to the guiding portions 12a in the first embodiment in such a manner that the guiding portions 21a are arranged at equal intervals in the circumferential direction not at the end portion but in an intermediate portion of the fixed drum 21. Further, a sliding portion 22 is so fitted in each of the guiding portions 21a as to be movable back and forth in the optical-axis direction. The sliding portion 22 corresponding to the sliding portion 11a in the first embodiment has a pin 13 provided on its outer peripheral surface.

On the other hand, the lens unit L1 is joined to an inner periphery of the sliding portion 22 with a screw through lens fixing rings 23, 24 disposed on its outer periphery. With this construction, the lens unit L1 is supported on the inner peripheral side of the fixed drum 22 by the three sliding portions 22 and moved in the direction of the optical axis A.

As discussed above, in accordance with the second embodiment, a lens holding member 25 is constructed of the sliding portion 22 and the lens fixing rings 23, 24 disposed on the inner peripheral side of the sliding portion 22. As a result, the present invention is applicable to not only the lens unit moved back and forth in the adjacent areas with respect to the fixed drum but also to the lens unit moved back and forth with respect to the intermediate portion of the fixed drum.

(Other Embodiments)

Note that the present invention is not limited the embodiments discussed above. The above-described embodiments are given by way of examples, and any embodiments having substantially the same construe as the technical concept according to claims of t present invention and exhibiting the same operation and effect, are included in the technical scope of present invention.

1) The first embodiment has exemplified construction in which the three sliding portions 11a are provided. However, the number of the sliding portions 11a may be one or two or over four if capable of stably moving the lens holding drum 11 in the optical-axis direction A. Similarly, in the second embodiment, there may be provided two or four or more sliding portions 22.

2) The first embodiment has exemplified the construction in which the lens holding drum 11 is disposed at the front portion of the fixed drum 12 along the optical axis. The lens holding drum 11 may be, however, at a rear portion of the fixed drum 12 along the optical axis.

3) The first embodiment has dealt with the case in which the present invention is applied to the mechanism for driving the focus adjusting lens unit. The present invention may be, however, applied to a mechanism for driving a focusing lens unit.

As discussed above in detail, according to the present invention, the lens holding drum or the lens 20 holding member is rectilinearly guided by the guiding portions of the fixed drum, and there is provided the sliding portion moved by the driving mechanism. Hence, it is possible to provide the compact lens barrel having the small outside diameter.

What is claimed is:

1. A lens barrel comprising:
   a lens unit movable in an optical-axis direction of said lens barrel;
   a lens holding drum, having a sliding portion protruded in the optical axis direction at its end portion, to hold said lens unit;
   a fixed drum having a portion with the same outer diameter as that of a portion of said lens holding drum and provided with a guiding portion at its end portion, to accommodate said sliding portion and rectilinearly guiding said sliding portion in the optical-axis direction; and
   a driving mechanism to drive said lens unit by acting upon said lens holding drum.

2. A lens barrel comprising:
   a lens unit movable in an optical-axis direction of said lens barrel;
   a lens holding member, having two or more sliding portions provided on an outer periphery in a circumferential direction, to hold said lens unit;
   a fixed drum having a guiding portion to accommodate said sliding portions and to rectilinearly guide said sliding portions in the optical-axis direction and having a portion with the same outer diameter as a portion of said lens holding member; and
   a driving mechanism to drive said lens unit by acting upon said lens holding member.

3. A lens barrel comprising:
   a lens unit;
   a lens holding drum, movable in an optical-axis direction of said lens barrel, for holding said lens unit, said lens holding drum having at least two first guiding surfaces connecting an inner peripheral surface to an outer peripheral surface of said lens holding drum and extending in the optical-axis direction;
   a fixed drum having at least two second guiding surfaces connecting an inner peripheral surface to an outer peripheral surface of said fixed drum and extending in the optical-axis direction, said first guiding surfaces respectively bearing a face-to-face relationship with said second guiding surfaces to thereby permit said lens holding drum to move in the optical-axis direction with respect to said fixed drum and to thereby inhibit said lens holding drum to rotate about the optical axis with respect to said fixed drum;

a cam ring disposed outwardly of said fixed drum and rotatable about the optical axis;

a cam groove formed in said cam ring;

a pin fixed to said lens holding drum and engaged with said cam groove; and a driving member for rotating said cam ring, wherein a rotation of said driving member generates a rotation of said cam ring, and said lens holding drum is thereby moved in the optical-axis direction with respect to said fixed drum by an engagement of said pin with said cam groove and by an engagement of said first guiding surface with said second guiding surface.

4. A lens barrel comprising:

a lens unit;

a lens holding member, movable in an optical-axis direction of said lens barrel, for holding said lens unit, said lens holding member having at least two first guiding surfaces extending inward from an outer surface of said lens holding member and extending in the optical-axis direction;

a fixed drum having at least two second guiding surfaces connecting an inner peripheral surface to an outer peripheral surface of said fixed drum and extending in the optical-axis direction, said first guiding surfaces respectively bearing a face-to-face relationship with said second guiding surfaces to thereby permit said lens holding member to move in the optical-axis direction with respect to said fixed drum and to thereby inhibit said lens holding member to rotate about the optical axis with respect to said fixed drum;

a cam ring disposed outwardly of said fixed drum and rotatable about the optical axis;

a cam groove formed in said cam ring;

a pin fixed to said lens holding member and engaged with said cam groove; and a driving member for rotating said cam ring, wherein a rotation of said driving member generates a rotation of said cam ring, and said lens holding member is thereby moved in the optical-axis direction with respect to said fixed drum by an engagement of said pin with said cam groove and by an engagement of said first guiding surface with said second guiding surface.

5. A lens barrel comprising:

a fixed drum;

a lens holding member, movable in an optical-axis direction of said lens barrel with respect to said fixed drum, to hold a lens unit;

a driving member to move said lens holding member, said lens holding member having at least two first guiding surfaces extending inward from an outer surface of said lens holding member and extending in the optical-axis direction, wherein said fixed drum has at least two second guiding surfaces extending inward from an inner surface of said fixed drum and extending in the optical axis direction, said first guiding surfaces respectively bear a face-to-face relationship with said second guiding surfaces, to thereby permit said lens holding member to move in the optical-axis direction with respect to said fixed drum and to inhibit said lens holding member to rotate about the optical axis with respect to said fixed drum, and said fixed drum has a portion with the same outer diameter as a portion of said lens holding member.

* * * * *

UNITED STATES PATENT AND TRADEMARK OFFICE
CERTIFICATE OF CORRECTION

PATENT NO.:   5,739,967
DATED     :   April 14, 1998
INVENTOR(S):  TANAKA, et al.

It is certified that error appears in the above-identified patent and that said Letters Patent is hereby corrected as shown below:

On the title page,

Item [73], After "Nikon Corporation, Tokyo, Japan" insert --Tochigi Nikon Corporation, Tochigi-ken, Japan--.

Signed and Sealed this

Twelfth Day of October, 1999

Attest:

Q. TODD DICKINSON

*Attesting Officer*   *Acting Commissioner of Patents and Trademarks*